United States Patent [19]

Kawakami et al.

[11] 4,247,496

[45] Jan. 27, 1981

[54] METHOD FOR IMPROVING THE SURFACE OF PLASTIC MATERIALS

[75] Inventors: Ken-Ichi Kawakami, Otsu; Shoji Saito, Kusatsu; Shizuo Togashi, Otsu, all of Japan

[73] Assignee: Toray Industries, Inc., Tokyo, Japan

[21] Appl. No.: 30,885

[22] Filed: Apr. 17, 1979

[30] Foreign Application Priority Data

Apr. 19, 1978 [JP] Japan ................... 53-45328

[51] Int. Cl.³ ............... B29C 17/02; B29C 25/00
[52] U.S. Cl. ..................... 264/22; 264/288.8
[58] Field of Search .......... 264/22, 25, 288.4, 288.8, 264/289.3, 290.2

[56] References Cited

U.S. PATENT DOCUMENTS

| | | | |
|---|---|---|---|
| 2,877,500 | 3/1959 | Rainer et al. | 264/22 |
| 3,126,680 | 3/1964 | Baird, Jr. et al. | 53/399 |
| 3,526,683 | 9/1970 | Heslop et al. | 264/22 |
| 3,773,870 | 11/1973 | Spillers | 264/22 |
| 3,872,194 | 3/1975 | Lowry et al. | 264/22 |
| 3,886,056 | 5/1975 | Kitamaru et al. | 264/22 |

FOREIGN PATENT DOCUMENTS 758461 10/1956 United Kingdom ............. 264/22

*Primary Examiner*—James B. Lowe
*Attorney, Agent, or Firm*—Stevens, Davis, Miller & Mosher

[57] ABSTRACT

The present invention relates to a method for improving the surface of plastic materials, particularly plastic films. The new method comprises stretching the film at least in one direction during or after irradiation with the ultra-violet light.

15 Claims, 5 Drawing Figures

METHOD FOR IMPROVING THE SURFACE OF PLASTIC MATERIALS

BACKGROUND OF THE INVENTION

This invention relates to a new method for improving the surface of thermoplastic materials, particularly plastic films. Thermoplastics are often used for such various applications as print-lamination, capacitor, printing, free-albums, metallizing, drawing, magnetic film base and optical application. But the stretched thermoplastics are not really suitable for the above applications because of their too smooth surfaces.

In order to improve the surface characteristics of stretched thermoplastics, various methods have been tried. Physical methods, such as scratching, sand-blasting and roll-embossing have been tried. Also, chemical etching has been tried. But these prior art methods have the disadvantage that the methods require so much labor cost and equipment expenses, because of the necessity of the surface-improvement processes besides film manufacturing line. Moreover, these prior art methods are not effective for all applications because they cannot control the level of the surface-improvement. As a consequence, the desired method has not been established yet.

SUMMARY OF THE INVENTION

This invention relates to improvement of the surface characteristics of plastic materials, particularly plastic films. The object of this invention is to provide plastics having improved surface properties such as slip, oil impregnation, drawability, and deluster. The method for this improvement is to stretch the irradiated plastics with ultra-violet light.

BRIEF DESCRIPTION OF THE DRAWING

FIG. 1 shows a surface stretched without ultra-violet irradiation.

FIG. 2 shows a surface stretched after 12 Joule/cm$^2$ of ultraviolet irradiation.

FIG. 3 shows a surface stretched after 72 Joule/cm$^2$ of ultraviolet irradiation.

FIG. 4 shows a surface stretched without ultra-violet irradiation.

FIG. 5 shows a surface stretched after 24 Joule/cm$^2$ of ultra-violet irradiation.

DETAILED DESCRIPTION OF THE INVENTION

Figure 1:
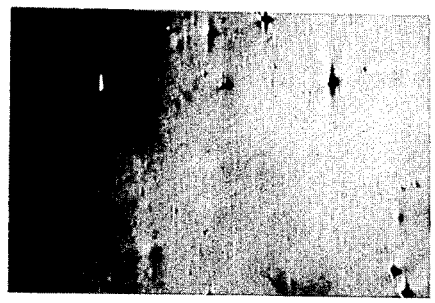
FIG. 1, FIG. 2 and FIG. 3 are photographs of surfaces of biaxially stretched polyethylene terephthalate films by a microscope (magnification: 1,000).

As indicated hereinabove, the present invention is directed to a method for surface improvement of plastic materials.

The process of the present invention is concerned primarily with stretching the plastic materials, particularly films, irradiated with the ultra-violet light (hereinafter referred to as UV), at least in one direction. In order to simplify the description hereinafter, films are represented as the typical plastic materials. And, though the stretching in the present invention may be carried out after the UV-irradiation or during the UV-irradiation, the description hereafter is limitedly concerned only with the stretching after the UV-irradiation.

It is most important in the present invention to use UV-irradiation along with the stretching. This is to say, the effect of the present invention cannot be obtained only by UV-irradation or only by stretching. Moreover, the effect of the present invention cannot be obtained by the UV-irradiation after stretching (The effect can be obtained, as indicated hereinafter, by stretching the UV-irradiated film once stretched.). In conclusion, the effect of the present invention is contributed to the process of stretching after UV-irradiation.

In accordance with this present invention, all stretchable thermoplastic polymers are applicable, which comprises such materials as polyolefines (polyethylene, polypropylene, ethylenepropylene copolymer, etc.), polyesters (polyethylene terephthalate, polybuthylene terephthalate, etc.), polyamides (nylon-6, nylon-66, nylon-12, etc.), and polystyrenes (polystyrene, styrene-acrylonitrile, etc.). Polypropylene (hereinafter referred to as PP) and polyethylene terephthalate (hereinafter referred to as PET) are preferred to be used for this invention. If necessary, any well-known additives and/or other polymers may be incorporated into the thermoplastic polymers. Such UV-sensitive additives as benzophenone are sometimes preferably incorporated.

UV used in the present invention has a wavelength ranging from 180 to 400 m$\mu$, and, preferably, from 190 to 380 m$\mu$, emitted by such light sourses as low and/or high pressure mercury lamps, fluorescent lamps, xenon lamps and carbon-arc lamps. At least one surface of the film is irradiated with the UV from a light sources 1–50 cm away from the film. The temperature of the film in the irradiation zone may be room temperature. It is preferred for better treatment-level to preheat the film just before the irradiation. It is also preferred to use oxygen, ozone, nitrogen or carbon-dioxide gases other than air as an atmosphere in the irradiation zone.

The irradiation energy may range from 1 to 5,000 Joule/cm$^2$. The irradiation energy can be measured by a UV-radio meter which is set at the surface level of the film. The meter indicates the light intensity per unit area and unit time (Watt/cm$^2$). The irradiation energy is defined as the product of the light intensity and irradiation time, and expressed in the Joule/cm$^2$ (hereinafter preferred to as J/cm$^2$). The irradiation energy should be selected within the range according to the desirable surface treatment level of the various polymer materials as mentioned below.

First, in order to make the film surface slippery without any sacrifice of transparency of the film, the appropriate irradiation energy is from 1 to 10 J/cm$^2$ for PP, and from 5 to 50 J/cm$^2$ for PET, respectively. If the energy is lower than the above range, the slippery effect is unsatisfactory. On the other hand, if the energy is higher than the above range, the transparency becomes bad. After the irradiation within the energy range above mentioned, the film is then stretched, and the resulting stretched film has the surface roughness between 0.01 and 0.50 $\mu$m.

Second, in order to make the film surface delustered, moist and oil-impregnating, the appropriate irradiation energy is from 5 to 50 J/cm$^2$ for PP, and from 50 to 500 J/cm$^2$ for PET, respectively. If the energy is lower than the above range, the results are unsatisfactory. On the other hand, if the energy is higher than the above range, the film becomes too hazy. After the irradiation within the energy range above mentioned, the film is then stretched, and the resulting film has the surface roughness between 0.5 and 5.0 μm.

Third, in order to make the film surface drawable with pencil, the appropriate irradiation energy is from 10 to 100 J/cm² for PP, and from 500 to 5,000 J/cm² for PET, respectively. If the energy is lower than the above range, the drawability results unsatisfactory. On the other hand, if the energy is higher than the above range, the film becomes deteriorated and brittle. After the irradiation within the energy range above mentioned, the film is then stretched, and the resulting film has the surface roughness between 1 and 10 μm.

In accordance with this present invention, the applicable stretching methods are uniaxially stretching and biaxially stretching after UV-irradiation on unstretched films. In case of biaxially stretching, both of the conventional sequential and simultaneous biaxially stretching processes may be carried out. Besides, other stretching processes can be used as mentioned below.

(1) Unstretched film is first stretched in one direction, then UV-irradiated, and stretched again at right angle to the first stretching direction.

(2) Unstretched film is first UV-irradiated, then biaxially stretched, and stretched again in one direction.

The film is uniaxially stretched preferably from 4 to 8 times for PP, and from 2 to 5 times for PET. In the case of biaxially stretching, the film is preferred to be stretched in area from 20 to 60 times for PP, and from 5 to 20 times for PET, respectively its original area. The stretching temperature is selected according to the film material. For example, it is usual to use a temperature of from 120° to 160° C. for PP, and from 80° to 160° C. for PET.

Thus stretched film is then heat set, for example, at a temperature of from 120° to 240° C. for PET. It is preferred after heat-setting to give the film some prior art surface treatments, such as corona-treatment.

It must be mentioned that the UV-irradiation is not always carried out only after thermforming of the film. This is to say, the UV-irradiation can be carried out just when the film is molten.

Following are some examples of the most preferred embodiments of this invention. But the conditions are not intended to be used for restricting the scope of the present invention. The characterization methods in the description of the examples are as follows.

(1) Surface roughness

Surface roughness was represented as the difference between the maximum value and the minimum value on a surface roughness spectrum, due to JIS B-0601-1976, using Talysurf Model-4 apparatus manufactured by Taylor-Hobson Company.

(2) Slippery Property was represented as the static friction coefficient measured by ASTM D-1894-B method.

(3) Haze was measured by ASTM D-1003-52 method.

EXAMPLE 1

Figure 2:
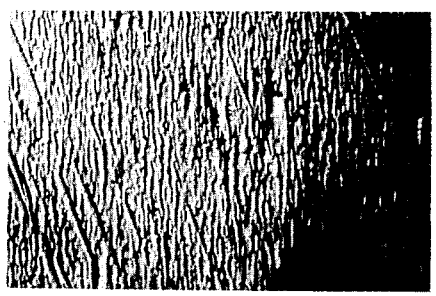

Unstretched transparent PET film (250 μm thick) containing almost no particle was prepared. One surface of the film was irradiated with UV light source (Mercury lamp H400-P manufactured by Tokyo Shibaura Electric Company) 10 cm away from the film surface in an air atmosphere zone for 10 minutes. The irradiation energy was measured 12 J/cm², and the temperature of the film surface in the irradiation zone was 80° C. By observation of this irradiated surface with a microscope, any structural and/or morphological changes could not be revealed. Its surface was as smooth as the original level before the irradiation. The film was biaxially stretched up to 3.3 times its original length in each direction at a temperature of 80° C., then heat set at a temperature of 220° C. for 10 seconds. Thus resulting film had the surface in FIG. 2 by observation with a differential interference microscope (magnification is 1,000). For comparison, the surface only biaxially stretched without UV-irradiation was illustrated in FIG. 1. In comparison of FIG. 2 with FIG. 1, it was found that the film stretched after UV-irradiation (FIG. 2) had many and small asperities on the irradiated surface. As the asperities were extremely small, the resulting surface was slippery and the film kept transparent as shown in the Table below.

| | Films | |
|---|---|---|
| | With UV-irradiation | Without UV-irradiation |
| Items | (FIG. 2) | (FIG. 1) |
| Haze (%) | 0.4 | 0.3 |
| Static friction coefficient | 0.50 | more than 4.0 |
| Surface roughness (μm) | 0.05 | less than 0.01 |

It must be emphasized that there found no changes on the surface of the 12 J/cm² UV-irradiated film once biaxially streteded without irradiation.

EXAMPLE 2

Figure 3:

This case followed Example 1, except for the irradiation energy. The energy was 72 J/cm². FIG. 3 shows the photograph of the resulting surface (magnification: 1,000). In comparison of FIG. 3 with FIG. 1 and FIG. 2, it was observed that the asperities grew larger with the increase of the irradiation energy. The surface roughness of the resulting film was measured 0.7 μm, which brought sufficient delustred effect and contributed remarkably towards improvement of such impregnating properties as wettability with oil.

EXAMPLE 3

Figure 4:
FIG. 4 and FIG. 5 are photographs of surfaces of biaxially stretched polypropylene films by a microscope (magnification: 40).
Figure 5:
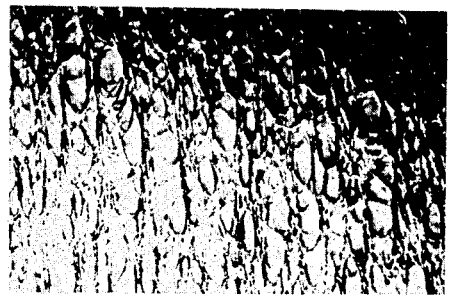

This case followed Example 1, except for the film material and the irradiation energy. Unstretched PP film was prepared, which film was formed from PP pellets of a melt index of 2.0 g/10 minutes containing almost no particle. The UV-irradiation energy of 24 J/cm² was covered the unstretched film surface at a temperature of 100° C. The irradiated film is pre-heated to 130° C., and, then, longitudinally stretched to 5 times its original length. Next, the film was transversely stretched to 9 times its original width in a tenter oven, wherein heated air at 155° C. was circulating. Thus biaxially stretched film was then heat-set in the heated air at 163° C. for 3 seconds, while permitting the film to relax in width by a factor of 8% of its stretched width. The heatset film was then quenched rapidly. Thus obtained film was 8 μm thick, and FIG. 5 shows the surface by observation with a plase-contrast microscope. For comparison, the surface only biaxially stretched without UV-irradiation was illustrated in FIG. 4. Magnification of the both microscopic photographs was 40. In comparison of FIG. 5 with FIG. 4, it was made clear that the film stretched after UV-irradiation (FIG. 5) had many and evident fibril-like patterned structure on the irradiated surface. The other results are shown in the Table below.

| | Films | |
|---|---|---|
| Items | With UV-irradiation (FIG. 5) | Without UV-irradiation (FIG. 4) |
| Haze (%) | 31.6 | 1.5 |
| Static friction coefficient | 0.50 | 0.65 |
| Surface roughness (μm) | 3.20 | 0.06 |

The matted surface of the film thus obtained was found to be sufficient for delustered property, drawability with pencils, and such impregnating properties as capacitor-oil. It should be added that there was found almost no changes on the surface of the 24 J/cm² UV-irradiated film once biaxially stretched without irradiation.

EXAMPLE 4

Un-stretched nylon-6 film (manufactured by using "Amilan" CM-1021L, Toray Ind., Inc.), 300 μm thick, was UV-irradiated by the energy of 36 J/cm². The film was then preheated to 90° C., and, then stretched simultaneously to 3.3 times in the longitudinal and transverse direction respectively and then heat set at the temperature of 180° C. Thus obtained biaxially film was 25 μm thick. The following Table shows the evaluation results of the film in comparison with the one that was stretched without UV-irradiation.

| | Films | |
|---|---|---|
| Items | With UV-irradiation | Without UV-irradiation |
| Haze (%) | 35.2 | 1.0 |
| Static friction coefficient | 0.40 | 0.80 |
| Surface roughness (μm) | 3.55 | 0.08 |

The matted surface of the film thus obtained was sufficient enough for delustered property, moist property and oil-impregnating property along with drawability with pencils.

EXAMPLE 5

Un-stretched polystyrene film (manufactured by using "Stylon 679," Asahi Dow Ltd.) was UV-irradiated by the energy of 50 J/cm², and then biaxially stretched to 3.5 times the longitudinal and the transverse direction. Film thus obtained biaxially film was 20 μm thick. The following Table shows the evaluation results of the film in comparison with the one that was stretched without UV-irradiation.

| | Films | |
|---|---|---|
| Items | With UV-irradiation | Without UV-irradiation |
| Haze (%) | 5.3 | 0.4 |
| Static friction coefficient | 0.40 | 4.0 |
| Surface roughness (μm) | 0.15 | 0.05 |

EXAMPLE 6

Un-stretched PET yarn containing almost no particle was UV-irradiated by the energy of 20 J/cm². Then, the 80 denier filament was obtained by conventional stretching process. Next, a sheet of textile was obtained by using the filament. It was found that the textile brought a large improvement in the hand softness, moist property and dyeability, compared with the textile by using the filament without UV-irradiation.

What is claimed is:

1. A method of imparting a slippery surface to a film of polypropylene or polyethylene terephthalate which comprises both stretching said film and subjecting said film to ultraviolet light of an irradiation energy of about 1 to 10 Joule per cm² in the case of polypropylene and 5 to 50 Joule per cm² in the case of polyethylene terephthalate whereby said film becomes slippery.

2. A method of claim 1, wherein said film is polyethylene terephthalate.

3. A method of claim 1, wherein said film is polypropylene.

4. A method of claim 1, wherein the stretching and ultraviolet treatments are carried on simultaneously.

5. A method of claim 1, wherein the ultraviolet light treatment precedes the stretching.

6. A method of providing a film of polyethylene terephthalate or polypropylene with a delustered, moist and oil-impregnable surface which comprises both stretching said film and subjecting said film to ultraviolet light irradiation, of an irradiation energy of about 5 to 50 Joule per cm² in the case of polypropylene and 50 to 500 Joule per cm² in the case of polyethylene terephthalate, whereby said film becomes delustered, moist and oil-impregnable.

7. A method of claim 6, wherein said film is polyethylene terephthalate.

8. A method of claim 6, wherein said film is polypropylene.

9. A method of claim 6, wherein the stretching follows the ultraviolet light irradiation.

10. A method of claim 6, wherein the stretching and ultraviolet light irradiation occur simultaneously.

11. A method of enhancing the drawability of a film of polyethylene terephthalate or polypropylene which comprises both stretching said film and subjecting said film to ultraviolet light of an irradiation energy of about 10 to 100 Joule per cm² in the case of polypropylene and 500 to 5000 Joule per cm² in the case of polyethylene terephthalate, whereby the drawability of said film is enhanced.

12. A method of claim 11, wherein the film is polypropylene.

13. A method of claim 11, wherein said film is polyethylene terephthalate.

14. A method of claim 12 or 13, wherein the stretching follows the ultraviolet light treatment.

15. A method of claim 12 or 13, wherein the stretching and ultraviolet light treatment occur simultaneously.

* * * * *